Patented Oct. 5, 1954

2,691,064

UNITED STATES PATENT OFFICE 2,691,064

MEASURING CIRCUITS

Judson O'D. Shepherd, Atlanta, Ga., assignor to American Telephone and Telegraph Company, a corporation of New York Application February 21, 1950, Serial No. 145,362

10 Claims. (Cl. 179—7.1)

This invention relates to timing or counting circuits and more particularly to a circuit adapted to transmit an indication of the termination of each of a plurality of time or other intervals.

An object of this invention is to provide a timing circuit of small cost and high accuracy.

Another object of this invention is to provide a timing circuit operable in response to an external initiating condition to transmit an indication of the expiration of a preset time interval and of each expiration of an equivalent interval thereafter.

These objects have been attained, in the preferred embodiment of this invention, by providing a common circuit continuously operative to define sequentially the successive incremental intervals of a time or similar cycle by repetitively and selectively energizing a first plurality of conductors in accordance with a combination code. Concurrently, the common circuit transmits indications sequentially defining the successive incremental intervals over a second plurality of conductors on the same or on a different code basis. Time interval measurement will be used in describing this invention.

Registers are provided individual to each external circuit to be timed. Upon the receipt of an initiating indication from that external circuit, the registers individual to that external circuit are momentarily associated with the first plurality of conductors from the common circuit. The registers are thereby operated to record the particular instant in the cycle from which time is to be measured. A second plurality of conductors from the common circuit is also associated with the registers. By virtue of the indications transmitted over this second plurality of conductors, the registers are effective upon the recurrence of the corresponding particular instant in each succeeding cycle, to transmit an indication thereof to the external circuit.

The principles of the invention may find application in a variety of fields such as in communication and in production. They are applicable to various detectable conditions, and particularly to those involving cyclical operations.

Figure 1:
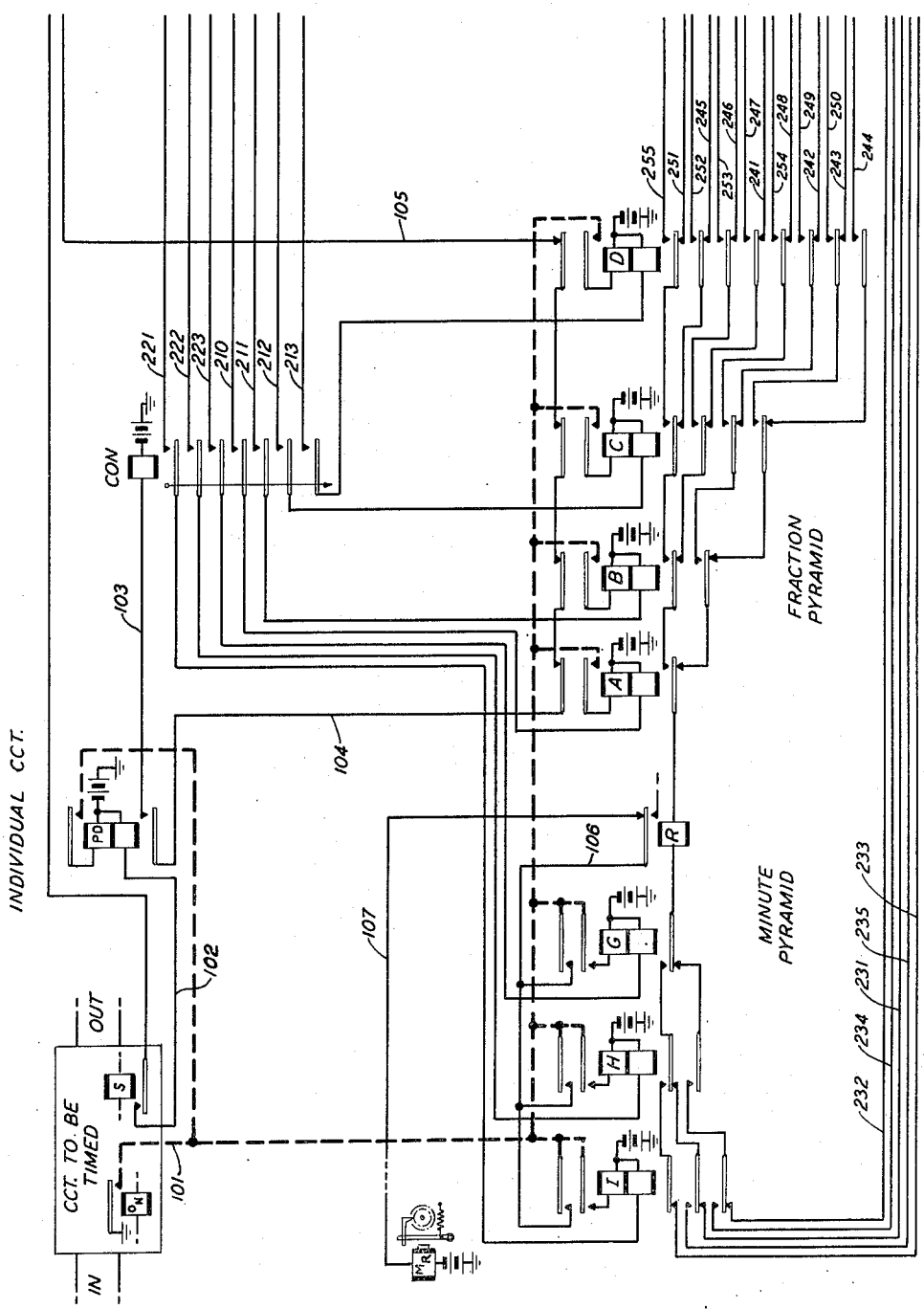
Figure 2:
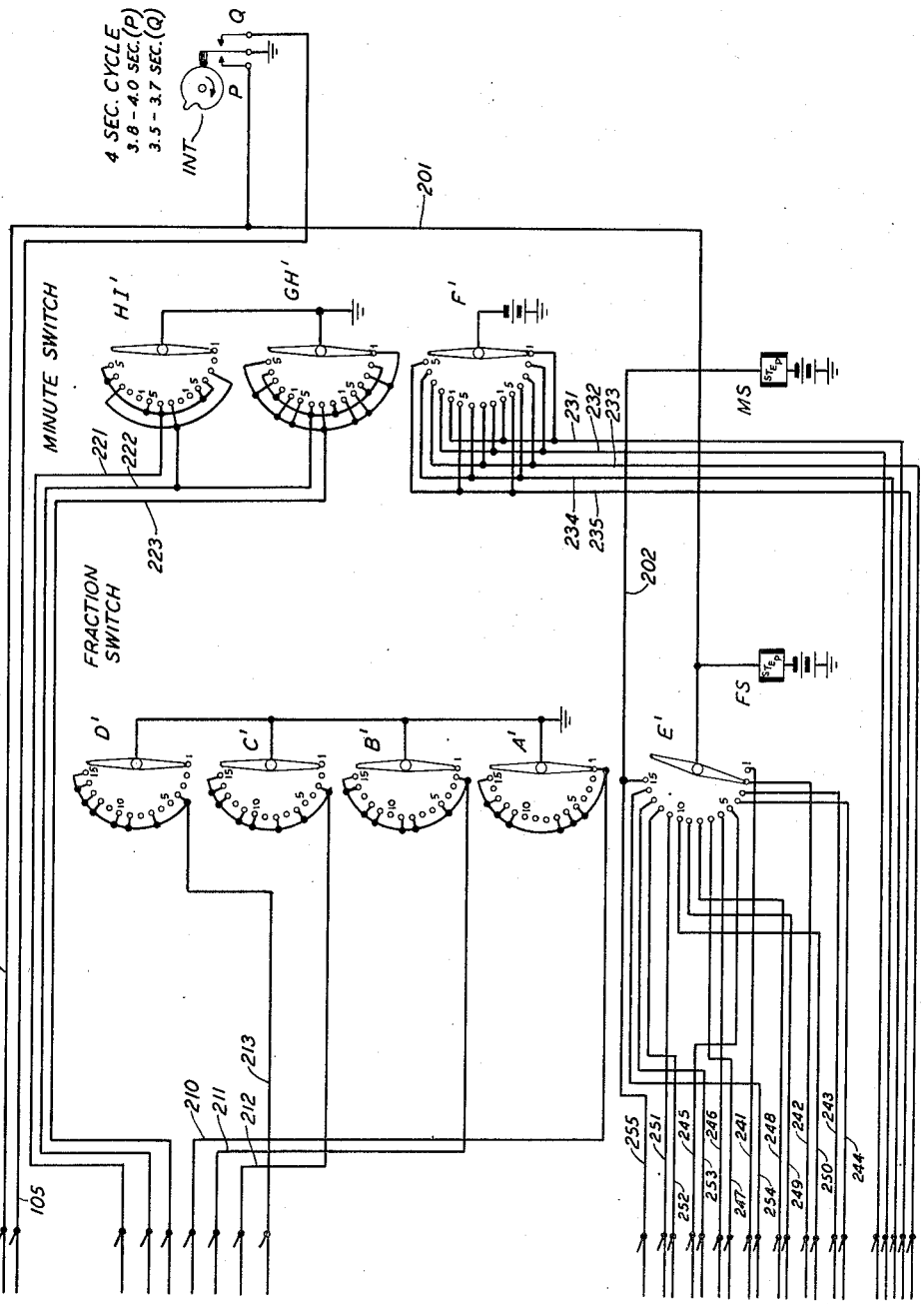

The invention will be more fully understood from the following detailed description of the preferred embodiment thereof when read in conjunction with the accompanying drawings in which:

Fig. 1 shows the portion of the timing circuit which is provided individual to each external circuit to be timed, and Fig. 2 shows the portion of the timing circuit which is common to the circuit shown in Fig. 1 and to all other like circuits which may be provided. Fig. 2 should be placed to the right of Fig. 1 for proper orientation.

The invention may be utilized in any application in which an indication is to be transmitted at regular intervals or counts after an initiating condition occurs. As an example, in telephony many subscribers are charged on a message-rate basis. In standard practice, on a call to a given destination a certain charge is made for the first interval of conversation time or fraction thereof, and an additional charge is made for each additional standard interval during which the connection continues to be established. For purposes of clarity, it is herein assumed that this standard interval is five minutes, although it will be apparent that this time is arbitrary and that the circuits may readily be modified to operate over a cycle of any desired duration. The circuits may also be arranged to provide any reasonable degree of preciseness of measurement. The incremental interval may be one minute or any suitable fraction thereof or any other unit of temporal mensuration. In the preferred embodiment, the incremental interval has been selected as one-fifteenth of a minute or four seconds, but this is purely exemplary.

Referring now to Fig. 2 of the drawings, means are provided selectively and sequentially to establish selected electrical conditions on a plurality of sets of conductors. This means may comprise any suitable commutator arrangement. In the preferred embodiment, however, two rotary switches are utilized, each having a plurality of banks. The "fraction" of a minute rotary switch comprises switch banks A', B', C', D', and E', each having fifteen contact points corresponding to the fifteen 4-second increments of a minute. The brushes associated with each of these banks sequentially traverse their respective contact points under the control of stepping magnet FS in the well-known manner. It will be noted that the brush of bank E' is positioned so as to be continuously one step in advance of the remaining brushes of the fraction rotary switch for a purpose hereinafter to be discussed.

Stepping magnet FS is operated under the control of contact P of interrupter INT. This interrupter may be of any of the well-known forms of such devices. In the preferred embodiment the camming (or commutating in other types) surfaces are arranged so that with the interrupter INT operating on a 4-second cycle, contacts Q are closed for 0.2 second, then, 0.1 second after contacts Q are opened, contacts P are closed for 0.2 second, then, 3.5 seconds later, contacts Q are again closed for 0.2 second, and so on. These interrupter closures are illustrative.

When interrupter contacts P are closed, a circuit is completed from ground through those contacts, conductor 201, winding of stepping magnet FS, and to battery, thereby operating the stepping magnet. In the normal form of rotary switch, the stepping of the brushes does not occur until the stepping magnet is released. Therefore, 0.2 second later when contacts P are opened, stepping magnet FS releases and the brushes of the fraction switch are advanced one step. Thereafter as contacts P are repetitively opened at 4-second intervals, the brushes of the fraction rotary switch are successively stepped in a clockwise direction.

A conductor is connected to selected ones of the contact points of each of the banks A', B', C' and D' of the fraction switch in accordance with a code. Thus, conductor 210 is connected to the Nos. 1, 5, 6, 7, 11, 12, 13 and 15 contact points of bank A'; conductor 211 is connected to the Nos. 2, 5, 8, 9, 11, 12, 14 and 15 contact points of Bank B'; conductor 212 is connected to the Nos. 3, 6, 8, 10, 11, 13, 14 and 15 contact points of bank C'; and conductor 213 is connected to the Nos. 4, 7, 9, 10, 12, 13, 14 and 15 contact points of bank D'. The brushes associated with these banks are grounded. Therefore, as the brushes sequentially engage the contacts of their respective banks, conductors 210, 211, 212 and 213 are grounded in a series of fifteen different combinations. An exemplary code will be tabulated hereinafter.

It will be noted that the brush of bank E' of the fraction switch is also connected to conductor 201. Therefore, during the 0.2 second period just prior to the time at which the brush is stepped to its next contact point, ground potential is applied through that brush to the contact point with which it is then in engagement. After the brush of bank E' has been stepped around so that it engages contact point No. 15, when contacts P of interrupter INT close, ground will be conducted via the brush and contact point No. 15 of bank E', conductor 202, winding of stepping magnet MS and to battery, causing the latter magnet to position its stepping pawl. When contacts P of interrupter INT open 0.2 second later, magnet MS is released. Magnet MS controls the stepping of the "minute" rotary switch comprising banks HI', GH' and F'. Therefore, for each fifteen steps of the fraction switch, the minute switch is stepped once. Since the fraction switch is stepped each four seconds, the minute switch is stepped once each minute. These operations proceed continuously.

Conductors 221, 222 and 223 extend from banks HI' and GH' of the minute switch. These conductors are associated with the contact points of these banks in accordance with any suitable code. Since a 5-minute timing cycle has been assumed, and since fifteen contact points per bank are shown for convenience, each contact bank is divided into three groups and the contacts points in each group are numbered 1 to 5. In the preferred embodiment, conductor 221 is connected to the Nos. 4 and 5 contact points in each of the three contact groups in bank HI', conductor 222 is connected to the No. 3 contact point in each group in bank HI' and to the Nos. 2 and 4 contact points in each group in bank GH', and conductor 223 is connected to the Nos. 1, 3 and 5 contact points in each of the three groups in bank GH'. Therefore, as the brushes sequentially engage the contacts in each group of their respective banks, conductors 221, 222 and 223 are grounded in a series of five different combinations in accordance with an exemplary code which will be tabulated hereinafter.

The common circuit of Fig. 2 may be considered to constitute a primary register comprising one or more sub-registers, viz., the minute switch and the fraction switch.

Referring now to Fig. 1, an individual circuit is shown. This circuit is to be associated with a circuit to be timed, shown in block diagram, and with the common circuit of Fig. 2. Multiplying straps are shown on all conductors extending from the common circuit, and the corresponding conductors of all individual circuits which are provided are connected to the common circuit at these points.

The circuit to be timed is here assumed to be provided with, or providable with, electrical contacts to which conductors from the individual circuits may be connected. One set of these contacts provides a source of ground potential and the other closes a loop. As an example, in telephone switching systems, a supervisory relay S is normally provided which is operated when the called subscriber answers the telephone. The operation of relay S, therefore, is an indication of the initiation of the conversation period. Relay ON in the circuit to be timed is normally operated prior to the time relay S is operated and, in operating, closes ground through its contact to off-normal ground conductor 101, shown as a dashed line in Fig. 1.

When relay S in the circuit to be timed is operated, an operating circuit for preliminary delay relay PD is prepared. This circuit may be traced from battery, lower winding of relay PD, conductor 102, contacts of supervisory relay S, conductor 201 to Fig. 2 contacts P of interrupter INT, and to ground. When contacts P close, relay PD is operated. Relay PD, in operating, locks operated through its upper winding and contact to ground on off-normal ground conductor 101. Relay PD, in operating, also prepares an operating circuit for connector relay CON over a path from battery, winding of relay CON, conductor 103, lower front contact of relay PD, conductor 104, through the outer upper back contacts of unoperated "fraction pyramid" relays A, B, C and D, conductor 105 to Fig. 2, contacts Q of interrupter INT, and to ground. When contacts Q close, relay CON is operated.

Relay CON, in operating, extends the output conductors 221, 222 and 223 from the "minute switch" banks HI' and GH' through the lower windings of "minute pyramid" relays I, H and G, respectively, to battery. Relay CON, in operating, also extends the output conductors 210—213 from the "fraction switch" banks A', B', C' and D', respectively, through the lower windings of "fraction pyramid" relays A, B, C and D, respectively, to battery. At this instant, therefore, the "minute pyramid" and "fraction pyramid" register relays will be operated in accordance with which of the output conductors are then grounded through the "minute switch" and "fraction switch" banks. These relays are thereby operated to register an indication of the instant from which the time interval is to be measured.

The grounding of the output conductors and the operation of the register relays in accordance with an exemplary code may be tabulated as follows:

Minutes

| Minute | Conductors Grounded | Relays Operated | | |
|---|---|---|---|---|
| 1 | 223 | G | | |
| 2 | 222 | | H | |
| 3 | 222, 223 | G | H | |
| 4 | 221, 222 | | H | I |
| 5 | 221, 223 | G | | I |

Fractions of minutes

| Fraction | Conductors Grounded | Relays Operated | | | |
|---|---|---|---|---|---|
| 1 | 210 | A | | | |
| 2 | 211 | | B | | |
| 3 | 212 | | | C | |
| 4 | 213 | | | | D |
| 5 | 210, 211 | A | B | | |
| 6 | 210, 212 | A | | C | |
| 7 | 210, 213 | A | | | D |
| 8 | 211, 212 | | B | C | |
| 9 | 211, 213 | | B | | D |
| 10 | 212, 213 | | | C | D |
| 11 | 210, 211, 212 | A | B | C | |
| 12 | 210, 211, 213 | A | B | | D |
| 13 | 210, 212, 213 | A | | C | D |
| 14 | 211, 212, 213 | | B | C | D |
| 15 | 210, 211, 212, 213 | A | B | C | D |

Each of the "minute pyramid" and "fraction pyramid" register relays, in operating, locks to ground on off-normal ground conductor 101 through its upper winding and inner upper front contact. Any one or more of the "fraction pyramid" register relays A, B, C or D, in operating, interrupts, at its outer upper back contact, the previously traced energizing path for connector relay CON so that the latter relay will not be reoperated at subsequent closures of contacts Q of interrupter INT. Relay CON is of the slow-to-release type to insure that the register relays will have operated and locked operated prior to the opening of the energizing paths therefor by the release of relay CON.

Upon the operation of any one or more of the "minute pyramid" register relays G, H or I, a circuit is completed from ground on off-normal ground conductor 101, through the outer upper front contact of each of the relays G, H and I which is operated, conductor 106, back contact of relay R to conductor 107. In the preferred embodiment, conductor 107 extends through the winding of a message register MR and to battery, although it is to be understood that this device is but exemplary. Message registers of standard types normally perform the registration on release and consequently the energization of the winding thereof at this time only prepares the apparatus for subsequent registration.

Means are provided in the common circuit of Fig. 2 for systematically transmitting indications of the lapse of the successive increments of time. An indication is transmitted representing each minute of the 5-minute cycle and an indication is transmitted representing each of the fifteen fractional parts of a minute. The indications representing minutes are applied to the base of the minute pyramid, i. e., to the contacts of the "minute pyramid" register relays; the indications representing fractions of minutes are applied to the base of the fraction pyramid, i. e., to the contacts of the "fraction pyramid" register relays. The circuitry interconnecting these contacts in each pyramid is so arranged that a series circuit will be completed therethrough only upon the recurrence of the particular instant in the time cycle corresponding to that instant at which the register relays were originally operated.

This means in the common circuit of Fig. 2 comprises an additional bank associated with each of the rotary switches, and conductors extending therefrom. An additional fifteen-point bank F' is associated with the minute switch. This bank has a brush which is stepped simultaneously with the brushes of banks HI' and GH' by stepping magnet MS. This brush is connected to battery. The fifteen contact points of bank F' are in three groups of five contacts each, the contact points in each group being numbered from 1 to 5. Conductor 231 is connected to each of the three No. 1 contact points of bank F', conductor 232 is connected to each of the No. 2 contact points of bank F', conductor 233 is connected to each of the No. 3 contact points of bank F', conductor 234 is connected to each of the No. 4 contact points of bank F', and conductor 235 is connected to each of the three No. 5 contact points of bank F'. Therefore, conductors 231–235 are sequentially supplied with battery potential for one minute each in a 5-minute cycle. These conductors extend to the contacts of "minute pyramid" register relay I (Fig. 1). In accordance with which of the relays I, H and G are operated, one, and only one, of the conductors 231–235 is extended through the pyramid contacts of the "minute pyramid" register relays to the winding of relay R. It will be seen that with none of the relays G, H or I operated, no conductor 231–235 is extended to the winding of relay R. With relay G only operated, conductor 231 is extended through the middle lower back contact of relay I, inner lower back contact of relay H, lower front contact of relay G to the winding of relay R. Conductor 231 is supplied with battery potential during the first minute of each cycle and, as will be seen from the above tabulation, relay G is operated if the timing is initiated during the first minute of the 5-minute cycle. Similarly, with any combination of relays G, H and I operated as a result of timing being initiated in any one of the five 1-minute intervals, a path is closed through the contacts thereof to the winding of relay R only for the one of the conductors 231–235 which will be supplied with battery potential at the recurrence of that same minute interval in each successive 5-minute cycle. Thus, battery will be applied to the left-hand terminal of the winding of relay R during the recurring selected 1-minute intervals in each 5-minute cycle.

Referring again to Fig. 2, an additional fifteen-point bank E' is associated with with the "fraction" rotary switch. This bank is provided with a brush which is stepped by stepping magnet FS, but it may be noted that this brush normally rests one step in advance of the brushes associated with the remaining banks of the fraction switch, as mentioned, for a purpose hereinafter to be noted. The brush associated with bank E' is connected via conductor 201 to ground through contacts P of interrupter INT. Therefore, for the 0.2 second immediately prior to the time that the brush of bank E' is stepped to the next contact point of that bank, ground potential will be connected through the brush to the contact point which it then engages. Conductors 241–255 are connected to contact points Nos. 1–15, respectively, of bank E'. Therefore, conductors 241–255 will be sequentially grounded momentarily at 4-second intervals in a 1-minute cycle.

Conductors 241–255 extend to the base of the fraction period, i. e., to the contacts of "fraction pyramid" register relay D (Fig. 1). In a manner similar to that above described in relation to the "minute pyramid," the circuitry interconnecting the contacts of register relays A, B, C and D is such that with any one of those relays operated, or with any combination of more than one of those relays operated, only one of the conductors 245–255 will be extended to the winding of relay R. Thus, with relay A only operated, conductor 241 will be extended through a back contact of each of the register relays D, C and B and through the lower front contact of relay A to the right-hand terminal of the winding of relay R. Conductor 241 is grounded for 0.2 second during the first fractional-minute increment of each 1-minute cycle. In accordance with the above tabulation, relay A is operated solely if the timing is initiated during the first increment of each 1-minute cycle. Similarly, with any combination of relays A, B, C and D operated as a result of timing being initiated in any one of the fractional-minute intervals, a path is closed through the contacts thereof to the winding of relay R only for that one of the conductors 241–255 which will be grounded at the recurrence of the same fractional minute increment in each succeeding 1-minute cycle. Thus, ground will be applied momentarily to the right-hand terminal of the winding of relay R during the recurring 4-second interval in each 1-minute cycle.

It may therefore be seen that the "minute pyramid" and "fraction pyramid" register relays are initially operated in a combination which defines the instant in a 5-minute cycle in which timing was initiated. At the recurrence of the corresponding fractional-minute interval in each one minute, ground is momentarily applied to the right-hand terminal of the winding of relay R; and at the recurrence of the corresponding minute interval in each 5-minute cycle, battery is supplied to the left-hand terminal of the winding of relay R. At the concurrence of these two events, i. e., at the end of each 5-minute period following the initiation of timing, relay R will be operated for 0.2 second.

Relay R, in operating, opens its contacts to release message register MR thereby registering the elapse of the first time interval. Upon the release of relay R, the energizing circuit for message register MR is reestablished and the message register is reoperated in preparation for the recording of the elapse of the next succeeding 5-minute interval.

In some applications of this invention, it is desirable to transmit an impulse at the end of each measured interval. As will be readily apparent to one skilled in the art, this may be accomplished, for example, by connecting a control conductor to a front contact of relay R (Fig. 1).

Considering now the functioning of the preferred embodiment of the invention with an illustrative timing operation, let it be assumed that the contacts of the supervisory relay S in the circuit to be timed are closed at the time then defined by the common circuit as minute 3 and at the 10th fraction, i. e., 3 minutes and 40 seconds after the beginning of one of the timing cycles of the common circuit. It may be noted that this time is but relative and need not have any necessary relation to chronological time. Let it further be assumed that the contacts of relay S close 3 seconds after the beginning of the 4-second cycle of interrupter INT. When, 0.8 second later, contacts P of interrupter INT close, relay PD is operated. At the end of the cycle of interrupter INT 0.2 second later, contacts P are opened, the brushes of the "fraction switch" banks A', B', C' and D' are advanced to engage their respective No. 11 contact points (44 seconds) and the brush of bank E' is advanced to engage its No. 12 contact point, it being recalled that it is one bank contact ahead of the brushes of switch banks A' to D'. When 3.5 seconds later, contacts Q of interrupter INT are closed, relay CON will be operated to connect the register relays of Fig. 1 to the bank contacts of the common circuit of Fig. 2.

It may be noted that relay PD serves to provide a preliminary delay to prevent false charges. As above described, relay PD is operated during the 3.8 to 4.0 seconds of the 4-second timing cycle of interrupter INT and relay CON is operated during the 3.5 to 3.7 seconds of the next succeeding timing cycle. If the supervisory relay S in the circuit to be timed is operated at the end of this 4-second cycle while contacts P are closed, relay PD will operate immediately and relay CON will be operated 3.5 seconds later, thereby establishing 3.5 seconds as the minimum non-chargeable or "free" time period. If relay S operates at the beginning of the 4-second cycle of interrupter INT, relay PD will operate 3.8 seconds later and relay CON will not be operated until a total of 7.5 seconds after the supervisory relay S has operated. This is the maximum "free time" period.

At the operation of relay CON, with the brushes of bank HI' and GH' of the minute switch engaging their No. 3 contact points and with the brushes of banks A', B', C' and D' of the fraction switch engaging their No. 11 contact points, "minute pyramid" register relays G and H (for minute 3) and "fraction pyramid" register relays A, B and C (for fraction 11) will operate and lock operated. By this registration, the instant from which time is to be measured (3 minutes and 44 seconds) is defined.

It may be noted at this time that with the system in this condition, if the brush of bank E' were not one step in advance of the brushes of banks A', B', C' and D', a circuit would be immediately completed for the operation of relay R. The setting of the brush of bank E' one step in advance of the others thus avoids this condition and also provides a means for absorbing a portion of the "free" or non-chargeable time if the call continues more than five minutes.

As time passes, the brushes of the fraction switch and minute switch in the common circuits successively engage their contact points. Each time the brush of bank E' engages its No. 11 contact point, ground will be extended over conductor 251, through the inner lower back contact of relay D, and through the inner lower front contacts of operated relays C, B and A to the right-hand terminal of the winding of relay R. Battery will only be supplied to the left-hand terminal of the winding of relay R, however, during the 1-minute period of the third minute of the next 5-minute cycle when the brush of bank F' of the minute switch again engages one of its No. 3 contact points. At that time battery is transmitted through this contact point, conductor 233, through the inner lower back contact of relay I, and through the inner lower front contacts of operated register relays H and G to the winding of relay R. At the concurrence of these conditions, relay R will operate to release message register MR. When, 0.2 second later, the brush of bank E' is advanced one step, relay R will release, reoperating message register MR.

The circuit continues to operate in this fashion until the off-normal relay ON in the circuit to be timed is released to indicate the termination of the call. This interrupts the locking paths for all of the register relays and for relay PD. Relay S will also be released so that relay PD will not reoperate. The interruption of the off-normal circuit 101 upon the release of relay ON will also release the message register MR to cause it to make a registration since it is common practice to provide a registration for each five minutes or fraction thereof. The common circuit of Fig. 2 continues to operate.

It is to be recognized that the designation of one pyramid as "minutes" and the other as "fractions of minutes" is for simplification. If a 5-minute registration is to be used, this may be divided into such other increments as may be desired. That is, the disclosed system provides 75 increments (five minutes each divided into fifteen parts), but the 5-minute period may readily be divided into 225 increments, for example, thereby increasing the accuracy of timing. This will require the addition of another relay in the "minutes pyramid" whereby that period will then designate fifteenths of 5-minute periods and obvious modifications of the common circuit to provide the necessary fifteen codes per five minutes. That is, the fraction switch will step each one and one-third seconds and each rotation (fifteen steps) will advance the "minute" switch to the next of its fifteen positions, so that five minutes will comprise 225 increments.

It will further be noted that the circuits may be arranged to time over any desired cycle. If a cycle less than one minute is required, obviously the minute switch in the common circuit and the minute pyramid of the individual circuit may be omitted, with the left-hand terminal of the winding of relay R being connected directly to battery.

Additional pyramids and additional switches in the common circuit and/or a larger number of relays in each pyramid may be provided to extend the range of possible timing cycles. The circuit of relay R might then require obvious modifications such as the use of a marginal relay or a double-wound relay.

It is to be understood that the above-described arrangements are but illustrative of the application of the principles of the invention. Numerous other arrangements may be devised by those skilled in the art without departing from the spirit and scope of the invention.

What is claimed is:

1. In a signaling system, a primary register operable cyclically to register the successive increments of a predetermined time interval, a secondary register, means operative in response to an initiating condition to transfer the instant setting of said primary register to said secondary register, means thereafter effective through the continued advance of said primary register to compare its successive settings with the setting of said secondary register, a load device, and means operative when the setting of said primary register matches the setting of said secondary register for controlling said load device.

2. In a signaling system, a primary register operable cyclically to register the divisions of a predetermined time interval, a secondary register, means operative at the beginning of a time interval to be measured to transfer the instant setting of said primary register to said secondary register, means thereafter effective through the continued advance of said primary register to compare its successive settings with the setting of said secondary register, a load device, and means operable only when said primary register has advanced following the setting of said secondary register through a complete cycle representative of the predetermined time interval to match its setting with the setting of said secondary register for controlling said load device.

3. In a signaling system, a primary register operable cyclically to register the successive increments of a predetermined time interval, a secondary register, first means operative in response to an initiating condition, second means operative after a delay interval and in response to said first means to transfer the instant setting of said primary register to said secondary register, means thereafter effective through the continued advance of said primary register to compare its successive settings with the setting of said secondary register, a load device, and means operative when the setting of said primary register matches the setting of said secondary register for controlling said load device.

4. In a signaling system, primary registering means comprising a first register operable cyclically to register successive time units and a second register operable cyclically to register successive fractional parts of said time units, a secondary register, means operative in response to an initiating condition to transfer the instant setting of said primary registering means to said secondary register, means thereafter effective through the continued advance of said primary registering means to compare its successive settings with the setting of said secondary register, a load device, and means operative only upon the concurrent matching of the settings of said first and of said second registers with the setting of said secondary register for controlling said load device.

5. In a signaling system, primary registering means comprising a first register operable cyclically to register successive time units and a second register operable cyclically to register successive fractional parts of said time units, secondary registering means comprising a first group of relays and a second group of relays, means operative in response to an initiating condition to transfer the instant setting of said first register to said first group of relays and of said second register to said second group of relays, means thereafter effective through the continued advance of said primary registering means to compare the settings of said first register with the setting of said first group of relays and of said second register with the setting of said second group of relays, a load device, and means operative upon the concurrent matching of the said settings for controlling said load device.

6. In a signaling system, an interrupter, a primary register operable step-by-step under the control of said interrupter to register the successive increments of a predetermined time interval, a secondary register, first means operative in response to an initiating condition and under the control of said interrupter, second means operative in response to said first means and after a delay interval controlled by said interrupter to transfer the instant setting of said primary register to said secondary register, means thereafter effective through the continued advance of said primary register to compare its successive settings with the setting of said secondary register, a load device, and means operable only when said primary register has advanced following the setting of said secondary register through a complete cycle representative of the predetermined time interval to match its setting with the setting of said secondary register for controlling said load device.

7. In a signaling system, an interrupter, a primary registering means comprising a first register operable step-by-step under the control of said interrupter to register fractional divisions of time units, and a second register operable step-by-step at the end of each cycle of said first register to register the time units of a predetermined time interval, said primary registering means being operable cyclically to register the time divisions of said predetermined interval, a secondary registering means comprising a first group of relays selectively operable to register fractions of time units and a second group of relays selectively operable to register time units, means operable at the beginning of a time interval to be measured to associate said groups of relays with the registers of said primary registering means whereby the relays of said groups are selectively operated in accordance with the instant fractional time unit and time unit settings of the registers of the primary registering means, first matching circuits extended in succession by said first register in the successive positions of its advance over the contacts of the relays of said first group following their selective operation to compare the successive registrations of said first register with the registration set up by said first group of relays, second matching circuits extended in succession by said second register in successive positions of its advance over the contacts of the relays of said second group following their selective operation to compare the successive registrations of said second register with the registration set up by said second group of relays, a load device, and means operable in a circuit extending over a first and a second matching circuit when said first and second registers have advanced through a cycle representative of the predetermined time interval for controlling said load device.

8. In a signaling system, a clock controlled interrupter, primary registering means comprising a first register operable step-by-step under the control of said interrupter to register the fractional divisions of a minute and a second register operable step-by-step at the end of each cycle of said first register to register the minutes of a predetermined time interval, said registering means being operable cyclically to register the time divisions of said predetermined interval, a secondary registering means comprising a first group of relays selectively operable to register the fractions of a minute and a second group of relays selectively operable to register minutes, a relay operable at the beginning of a time interval to be measured to associate said groups of relays with the registers of said primary registering means whereby the relays of said groups are selectively operated in accordance with the instant fractional minutes and minute settings of the registers of said primary registering means, first matching circuits extended in succession by said first register in the successive positions of its advance over the contacts of the relays of said first group following their selective operation to compare the successive registrations of said first register with the registrations set up by said first group of relays, second matching circuits extended in succession by said second register in successive positions of its advance over the contacts of the relays of said second group following their selective operation to compare the successive registrations of said second register with the registration set up by said second group of relays, a relay operable in a circuit extending over a first and a second matching circuit when said first and second registers have advanced through a cycle representative of the predetermined time interval, and a register operable under the control of said latter relay to register the termination of the measured time interval.

9. In a signaling system, a primary register operable cyclically to register the successive increments of a predetermined time interval, a plurality of secondary registers, an external circuit individual to each of said secondary registers, means operative in response to an initiating condition in any of said external circuits to transfer the instant setting of said primary register to the ones of said secondary registers individual to said any of said external circuits, means thereafter effective through the continued advance of said primary register to compare its successive settings with the settings of said secondary registers, a load device, and means operative when the setting of said primary register matches the setting of any of said secondary registers individual to said any of said external circuits for controlling said load device.

10. In a signaling system, a primary register operable cyclically to register the successive increments of a predetermined time interval, a plurality of secondary registers, means operative in response to an initiating condition in a circuit associated with any one of said secondary registers to transfer the instant setting of said primary register to the associated one of said secondary registers, means thereafter effective through the continued advance of said primary register to compare its successive settings with the setting of said associated one of said secondary registers, a load device, and means operative when the setting of said primary register matches the setting of said associated one of said secondary registers for controlling said load device.

References Cited in the file of this patent

UNITED STATES PATENTS

| Number | Name | Date |
|---|---|---|
| 2,073,756 | Osten-Sacken | Mar. 16, 1937 |
| 2,079,721 | Shepherd | May 11, 1937 |
| 2,094,060 | Buach | Sept. 28, 1937 |
| 2,112,375 | Mead | Mar. 29, 1938 |
| 2,373,908 | Ostline | Apr. 18, 1945 |
| 2,400,085 | Gent | May 14, 1946 |
| 2,488,797 | Baker | Nov. 22, 1949 |
| 2,522,000 | Shepherd | Sept. 12, 1950 |